Patented Aug. 29, 1950

2,520,206

UNITED STATES PATENT OFFICE 2,520,206

SILVER BRAZING FLUX

Walter Goerg, North Bergen, N. J., assignor to Air Reduction Company, Incorporated, a corporation of New York No Drawing. Application December 17, 1948, Serial No. 65,975

4 Claims. (Cl. 148—23)

This invention relates to fluxes for use in silver brazing.

It has been found that a paste composed of boric acid, an alkali metal acid fluoride, an alkali metal tetraborate, and water, constitutes an excellent silver brazing flux but it has the disadvantage that if the supply of paste is allowed to remain exposed to the atmosphere for any appreciable time, say around 36 hours, at temperatures around room temperature, the resulting evaporation of moisture from the paste is accompanied by the formation of a crystal-like structure in the paste, probably due principally to crystallization of the tetraborate and boric acid and/or compounds formed by them. This imparts "graininess" to the paste and makes it less homogeneous, which is objectionable, and even when more water is added to the paste prolonged mixing is required to eliminate the graininess and remove lumpiness and to bring the paste to proper condition for usage, and in some cases the graininess is eliminated only with extreme difficulty.

The principal object of this invention is to provide a silver brazing flux paste, or a composition of matter from which such a paste can be prepared by the addition of water, having the three basic ingredients mentioned above but containing in addition certain ingredients that eliminate or minimize the above-mentioned crystallizing action of the ingredients of the flux paste.

I have discovered that if small amounts of sodium alginate and sodium hexametaphosphate are added to a mixture of water-soluble flux ingredients of the kind above mentioned and water is added to form a paste of the mixture, the tendency of the solids to crystallize out or separate from the liquid is eliminated or minimized. The invention, in its broader aspects, therefore resides in the provision of a silver brazing flux paste, or a composition of matter from which the paste can be prepared by the addition of water, consisting of these two substances added to boric acid, an alkali metal acid fluoride, and an alkali metal tetraborate.

The alkali metal acid fluoride is preferably potassium bifluoride and the alkali metal tetraborate is preferably potassium tetraborate.

The following formula is a specific example of the improved flux on both the dry and wet basis:

|  | Dry | Wet |
| --- | --- | --- |
|  | Percent | Percent |
| Boric acid | 30.25 | 25.75 |
| Potassium bifluoride | 39.38 | 33.50 |
| Potassium tetraborate | 30.25 | 25.75 |
| Sodium alginate | 00.105 | 00.105 |
| Sodium hexametaphosphate | 00.015 | 00.015 |
| Water | None | 14.88 |

The percentages of the ingredients above given are by weight. They are the preferred percentages but may be changed considerably. The range within which the percentage of each ingredient is preferably maintained is shown by the following table:

|  | Dry | Wet |
| --- | --- | --- |
|  | Percent | Percent |
| Boric acid | 27.00 to 33.50 | 23.00 to 28.50. |
| Potassium bifluoride | 36.75 to 41.50 | 31.00 to 35.50. |
| Potassium tetraborate | 27.00 to 33.50 | 23.00 to 28.50. |
| Sodium alginate | 00.105 to 00.125 | 00.105 to 00.125. |
| Sodium hexametaphosphate | 00.015 to 00.025 | 00.015 to 00.025. |
| Water | None | 13.88 to 15.88. |

The exact manner in which the sodium alginate and the sodium hexametaphosphate serve to prevent the crystallizing action in the flux paste is not known but it is thought that the gel produced by the sodium alginate when water is added to the mixture clothes or covers the solid particles of the composition or acts like a suspension medium and prevents crystallization when the flux paste is exposed to the atmosphere under certain temperature conditions. The sodium hexametaphosphate apparently prevents the sodium alginate gel from decomposing and thereby serves as a preservative for the gel, thus maintaining its gel characteristics indefinitely and its ability to function as a crystallization or lumping preventative.

The solid ingredients of the flux may be sold as a composition of matter to which the water may be added by the user to form the flux paste, or the water may be added at the time of manufacture and the composition sold in paste form. In either case after the paste is formed the sodium alginate and sodium hexametaphosphate will prevent the crystallizating action above referred to even when the paste is allowed to remain exposed to the atmosphere indefinitely, and if it is necessary to stir the paste to remix the ingredients, with or without the addition of more water, the mixing can be done quickly to produce a paste which will have its original homogeneous character free from graininess and lumpiness.

I claim:

1. A composition of matter adapted for the preparation of a paste suitable for use as a silver brazing flux consisting essentially of from 27% to 33.50% boric acid, from 36.75% to 41.50% potassium bifluoride, from 27.00% to 33.50% potassium tetraborate, from 0.105% to 0.125% sodium alginate, and from 0.015% to 0.025% sodium hexametaphosphate.

2. A composition of matter adapted for the preparation of flux paste suitable for use as a silver brazing flux comprising approximately 30.25% boric acid, approximately 39.38% potassium bifluoride, approximately 30.25% potassium tetraborate, approximately 0.105% sodium alginate, and approximately 0.015% sodium hexametaphosphate.

3. A paste adapted for use as a silver brazing flux consisting essentially of from 23.00% to 28.50% boric acid, from 31.00% to 35.50% potassium bifluoride, from 23.00% to 28.50% potassium tetraborate, from 0.105% to 0.125% sodium alginate, from 0.015% to 0.025% sodium hexametaphosphate, and from 13.88% to 15.88% water.

4. A paste adapted for use as a silver brazing flux comprising approximately 25.75% boric acid, approximately 33.50% potassium bifluoride, approximately 25.75% potassium tetraborate, approximately 0.105% sodium alginate, approximately 0.015% sodium hexametaphosphate, and approximately 14.88% water.

WALTER GOERG.

REFERENCES CITED

The following references are of record in the file of this patent:

UNITED STATES PATENTS

| Number | Name | Date |
|---|---|---|
| 2,267,763 | Streicher | Dec. 30, 1941 |
| 2,452,995 | Cinamon | Nov. 2, 1948 |
| 2,456,121 | Goerg | Dec. 14, 1948 |